US007877529B1

(12) United States Patent
Fensore et al.

(10) Patent No.: US 7,877,529 B1
(45) Date of Patent: Jan. 25, 2011

(54) LOW OVERHEAD, DATA TRANSPARENT SYNCHRONIZATION OF STREAMING SERIAL DATA

(75) Inventors: David J. Fensore, New Gloucester, ME (US); Robert L. Macomber, Portland, ME (US); James E. Schuessler, Grass Valley, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1188 days.

(21) Appl. No.: 11/047,311

(22) Filed: Jan. 31, 2005

(51) Int. Cl.
*G06F 5/00* (2006.01)
*G11B 5/00* (2006.01)
(52) U.S. Cl. .............................. 710/61; 710/30; 710/71; 714/700; 714/727; 714/731; 711/201; 375/145; 375/149; 370/366; 370/368
(58) Field of Classification Search ........................ None
See application file for complete search history.

(56) References Cited

U.S. PATENT DOCUMENTS 3,931,473 A * 1/1976 Ferris, Jr. ..................... 370/541
4,760,523 A * 7/1988 Yu et al. ........................ 707/7

\* cited by examiner

*Primary Examiner*—Eron J Sorrell
*Assistant Examiner*—Dean Phan

(57) ABSTRACT

Synchronization management is provided for a continuous serial data streaming application wherein the serial data stream includes a plurality of consecutive, identical-length segments of consecutive serial data bits. Synchronization management bits are provided in each segment. The synchronization management bits are programmed such that the synchronization management bits contained in first and second adjacent segments of the serial data stream will bear a predetermined relationship to one another. At the receiving end, the synchronization management bits are examined from segment to segment. In this manner, synchronization can be monitored, synchronization loss can be detected, and synchronization recovery can be achieved.

20 Claims, 5 Drawing Sheets

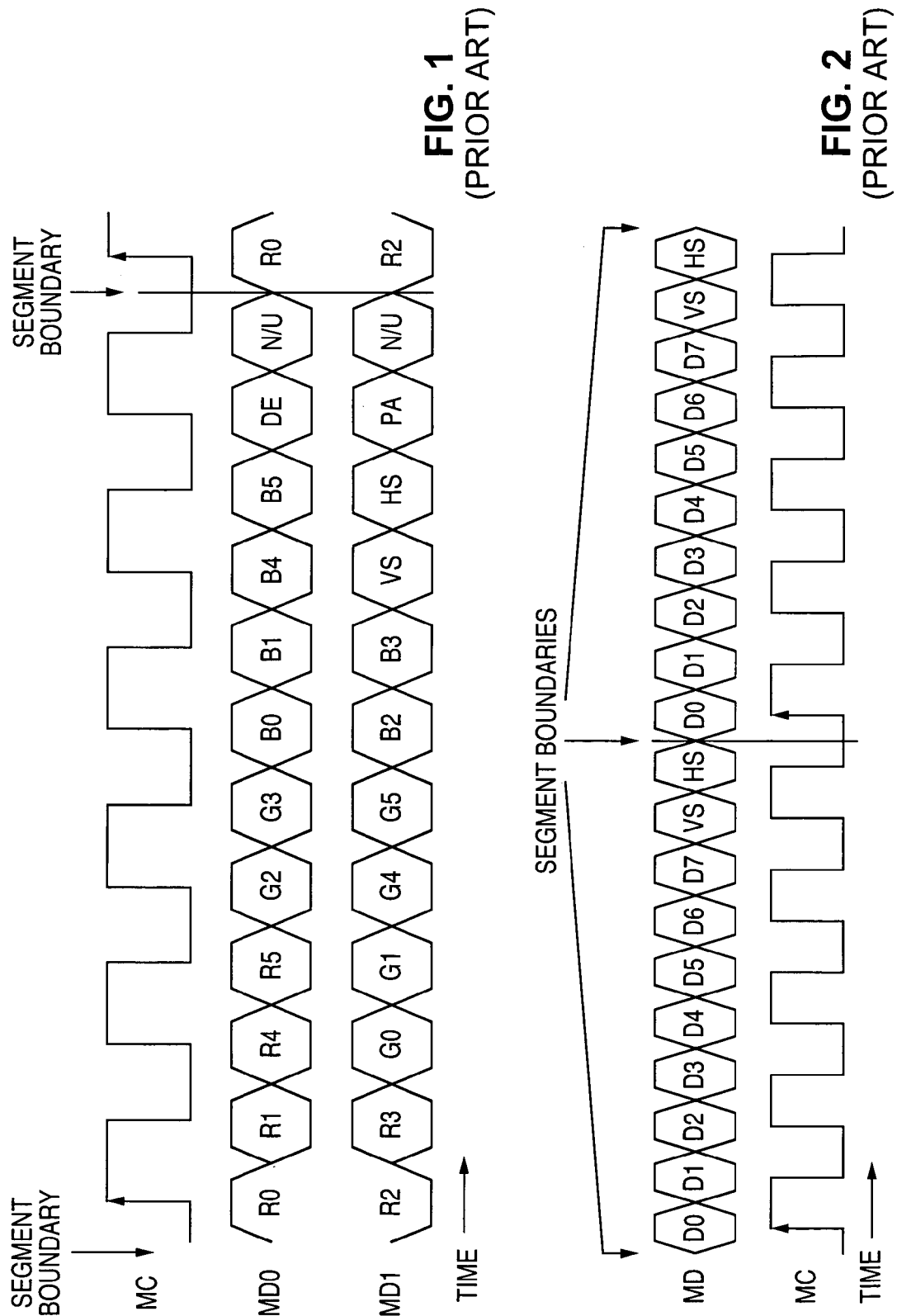

LOW OVERHEAD, DATA TRANSPARENT SYNCHRONIZATION OF STREAMING SERIAL DATA

TECHNICAL FIELD OF THE INVENTION

The invention relates generally to streaming serial data and, more particularly, to synchronization of streaming serial data.

BACKGROUND OF THE INVENTION

Streaming serial data has myriad applications in the modern world. Streaming serial data applications typically transfer large amounts of information in a continuous serial stream of data bits. Millions of data bits can be transferred across a continuously streaming serial data link, with a corresponding data bit accompanying every active edge of a continuously running serial data clock. Under these conditions, if the continuously streaming serial data link experiences a disturbance such as a noise event, then one cycle of the serial data clock can appear to the receiver to be two cycles of the serial data clock. This causes an erroneous data shift of the incoming serial data at the receiver. This type of error will prevent the receiver from correctly reading any of the subsequent data bits in the continuous serial data stream until the data stream can be re-synchronized to the serial data clock.

Due to the continuous nature of the streaming serial data, with every bit at every active clock edge carrying needed information, there is no time available for effective utilization of a conventional start bit for synchronization.

In general, there are two known synchronization approaches that can be applied to serial streaming data applications. One such approach utilizes so-called data transparent methods. Data transparent methods treat all data alike, with no timing dependencies. Because all data is treated alike, data transparent methods have relatively wide applicability in highly varied application environments. One conventional data transparent method uses the source clock directly, so errors "self heal" on the host side as the receiver realigns to the clock again rather quickly. Many data transparent methods use high overhead coding to create unique code words for synchronization. One limitation of some high overhead coding applications is a property referred to as error propagation. If a single random bit error occurs in the coded stream, it will cause many bits to be received in error before synchronization can be re-established.

The other known approach for synchronizing serial data streaming applications uses application dependent methods. Such methods utilize known features and characteristics of the transmitted data, such as features within the clocking or gating of the data. These methods require very little overhead, but can have limited applicability in non-standard, custom applications.

If a wide range of applications is desired, then a data transparent method would appear to be preferable to an application dependent method. However, as mentioned above, some data transparent methods have a relatively high overhead cost due to data expansion. In the case of conventional 4b/5b and 8b/10b codes, the data expands by twenty percent (20%), thus reducing the throughput of the link from the very start.

SUMMARY OF THE INVENTION

To address the above-discussed deficiencies of the prior art, it is a primary object of the present invention to provide low overhead, data transparent synchronization management for continuous serial data streaming applications. According to exemplary embodiments of the invention, synchronization management is provided for a continuous serial data streaming application wherein the serial data stream includes a plurality of consecutive, identical-length segments of consecutive serial data bits. Synchronization management bits are provided in each segment. The synchronization management bits are programmed such that the synchronization management bits contained in first and second adjacent segments of the serial data stream will bear a predetermined relationship to one another. At the receiving end, the synchronization management bits are examined from segment to segment. In this manner, synchronization can be monitored, synchronization loss can be detected, and synchronization recovery can be achieved.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation. A controller may be implemented in hardware, firmware or software, or some combination of at least two of the same. It should be noted that the functionality associated with a controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 1 illustrates the clock and data signals in a conventional serial data streaming application;

FIG. 2 illustrates the clock and data signals in another conventional serial data streaming application;

DETAILED DESCRIPTION OF THE INVENTION

Figure 3:
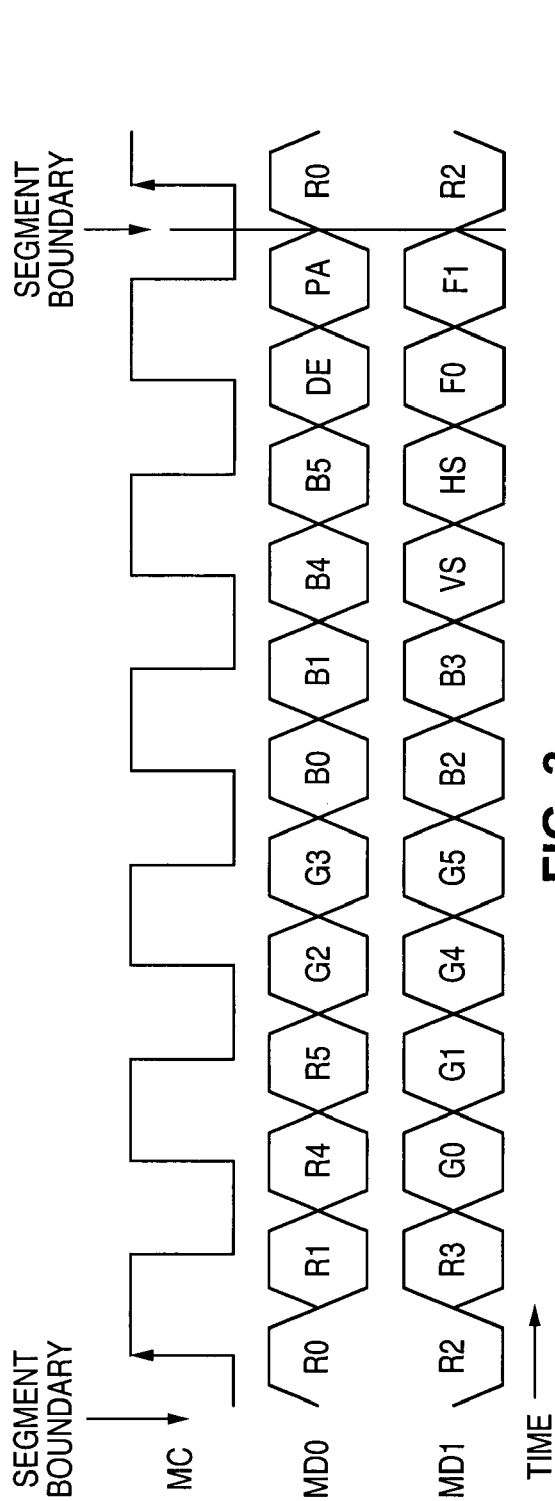
FIG. 3 illustrates how synchronization management signals can be incorporated into the serial data streaming application of FIG. 1 according to exemplary embodiments of the invention.

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processing system.

FIGS. 1 and 2 illustrate examples of the signals utilized in some conventional serial data streaming applications.

FIG. 1 corresponds to a 3-wire serial interface including two data lines MD0 and MD1, and a serial data clock MC. This 3-wire serial interface is utilized, for example, in mobile telephones with cameras and/or video displays that use conventional RGB streaming. In "flip-type" mobile telephones, the main data processor is typically provided on one side of the hinged joint of the mobile telephone, while the camera data processor and the video display processor are located on the other side of the hinged joint. Accordingly, the 3-wire serial interface of FIG. 1 is used to reduce the number of wires that traverse the hinge to effect communications between the main processor and the camera or display processor.

In the example of FIG. 1, 22 data bits from a 22-bit wide parallel bus have been serialized for serial transfer across the hinge on the two data line wires MD0 and MD1. Thus, only two data line wires (plus the wire for clock MC) traverse the hinge, rather than 22 parallel data wires. FIG. 1 thus illustrates one segment (or packet or frame) within a continuous serial data stream transmitted on the data lines MD0 and MD1. Each set of 22 parallel bits is serialized and transmitted in the format of the segment illustrated in FIG. 1. So the continuous serial data stream includes a plurality of consecutively transmitted segments, each formatted as shown in FIG. 1. The segment of FIG. 1 contains the data associated with a single pixel of an RGB streaming application. Double-edge clocking is used with the signals MD0 and MD1, so a new data bit appears on each data line with every rising and falling edge of the clock MC. In the segment of FIG. 1, the last bit on each data line is not used, as designated by N/U.

As will be evident hereinbelow, for purposes of the synchronization management techniques described herein, and for clarity of exposition, FIG. 1 can also be considered to illustrate two separate streams (MD0 and MD1) of 11-bit segments, each segment produced by serializing a set of 11 parallel bits.

FIG. 2 is similar to FIG. 1, but illustrates a two-wire serial interface, including a wire for data line MD and wire for serial data clock MC.

As indicated above, if a noise event causes one of the clock cycles in FIG. 1 or FIG. 2 to appear to the receiver to be two clock cycles, this causes an erroneous bit shift which will continue to produce erroneous data unless and until the synchronization loss is detected, and synchronization is re-established.

FIG. 3 illustrates how the segment of FIG. 1 can be modified to incorporate synchronization management bits F0 and F1 according to exemplary embodiments of the invention. In FIG. 3, the parity bit PA has been moved from the next-to-last bit position on line MD1 (as in FIG. 1) to the last bit position on line MD0.

The synchronization management bits F0 and F1 are provided as the last two bits on line MD1. All other bits in each segment of FIG. 3 are the same as in the corresponding segments of FIG. 1.

The synchronization management bits F0 and F1 (also referred to herein as the synchronization management bit pair) are programmed in a predetermined fashion so that, from one segment to the next, during a sequence of consecutive segments, the bits F0 and F1 can be seen to vary in a predetermined fashion. In some exemplary embodiments, the two bits F0 and F1 are utilized as a two-bit rollover counter field whose value is incremented in each successive segment of the serial data stream. In that particular case, if 4 consecutive segments are received, and the synchronization management bit pair in the first segment has the values F1=F0=0, then the second segment received can be expected to have the values F1=0 and F0=1, the third segment received can be expected to have the values F1=1 and F0=0, and the fourth segment received can be expected to have the values F1=F0=1. Then, the next (fifth) consecutive segment received can be expected to have F1=F0=0, thus beginning the two-bit counting sequence again. The pattern thus repeats every 4 segments, and it is very unlikely that such a pattern would be found when examining any other bit pairs. Moreover, even if this pattern were found within other bit pairs, the possibility that the pattern would repeat itself throughout many segments is quite small.

The above-described programming of the synchronization management bit pair F0,F1 as a two-bit counter is only one example of many ways to create a predetermined pattern that exhibits predetermined relationships between the synchronization management bit pairs of consecutive segments in the serial bit stream. The receiver is provided with the predetermined pattern and thus knows the expected relationship between the respective synchronization management bit pairs of any two consecutively received segments.

Figure 4:
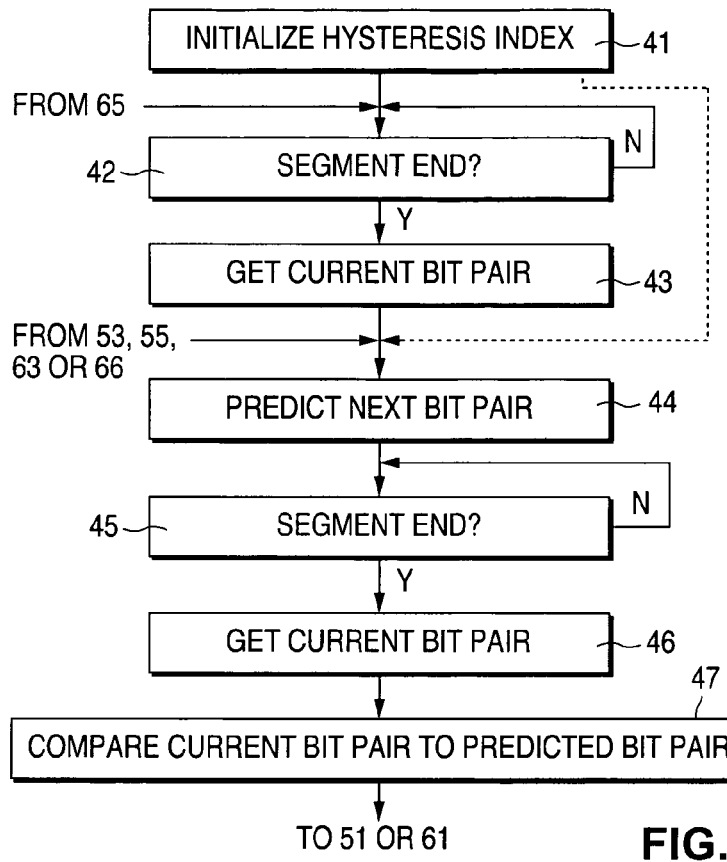
FIG. 4 illustrates exemplary operations which can be performed with respect to selected bit pairs of FIG. 3 according to exemplary embodiments of the invention.

FIG. 4 illustrates exemplary operations that can be performed according to the invention to determine whether the expected relationship exists between the respective synchronization management bit pairs of two consecutively received segments. At 41, a hysteresis index (described in more detail below) is initialized. At 42, when the segment end is detected (for example, by counting the edges of the serial data clock MC), then the synchronization management bit pair for the currently received segment is obtained at 43. Thereafter at 44, the synchronization management bit pair of the next consecutive segment is predicted from the currently received synchronization management bit pair based on the predetermined pattern known at the receiver. The end of the next segment is detected at 45, after which the (new) current synchronization management bit pair is obtained at 46. Thereafter at 47, the current synchronization management bit pair obtained at 46 is compared to the synchronization management bit pair that was predicted at 44.

Figure 5:
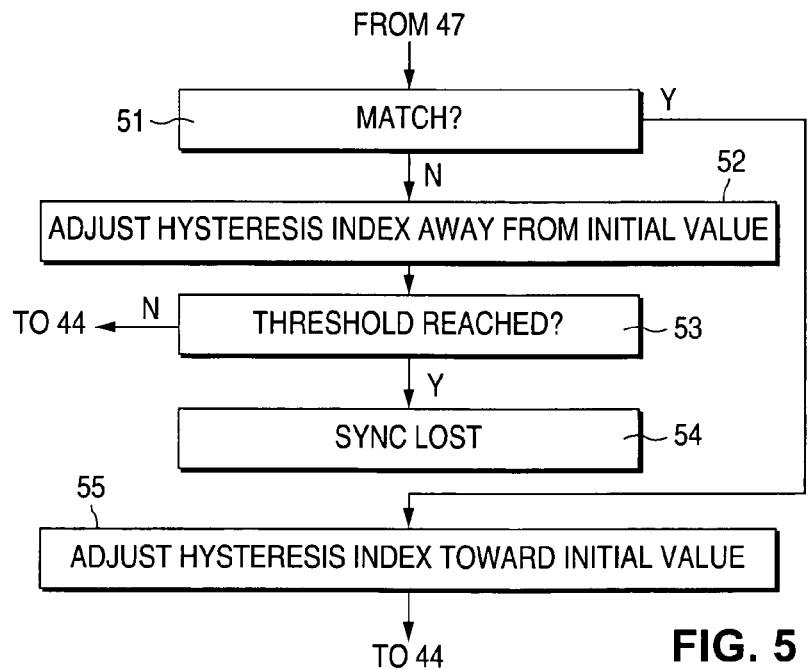
FIG. 5, taken together with FIG. 4, illustrates exemplary operations which can be performed to monitor synchronization according to exemplary embodiments of the invention.

Operations can then proceed from 47 in FIG. 4 to 51 in FIG. 5. FIG. 5 illustrates exemplary operations which, when combined with those of FIG. 4, can determine whether synchronization is being maintained. If the current bit pair matches the predicted bit pair at 51, then at 55, the hysteresis index is adjusted towards its initial value. Thereafter, operations return to 44 where the next synchronization management bit pair is predicted based on the previously predicted synchronization management bit pair and the predetermined pattern. On the other hand, if the current synchronization management bit pair does not match the predicted synchronization bit pair at 51, then at 52, the hysteresis index is adjusted away from its initial value. It is then determined at 53 whether or not the hysteresis index has reached a threshold distance away from its initial value. If not, then operations return to 44 in FIG. 4, where the next synchronization management bit pair is predicted based on the previously predicted synchronization management bit pair and the predetermined pattern. If the threshold distance has been reached at 53, then synchronization is considered to be lost, as indicated generally at 54.

As can be seen from the foregoing description of FIGS. 4 and 5, if the predetermined pattern is detected (i.e., the prediction matches at 51) often enough to prevent the hysteresis index from traversing the threshold distance away from its initial value, synchronization is considered to be maintained. The hysteresis index thus helps prevent occasional bit errors in F0,F1 from resulting in a conclusion that synchronization has been lost. However, if the hysteresis index reaches the threshold distance away from its initial value, then the predetermined pattern has not been detected often enough to warrant a conclusion that synchronization still exists, so synchronization is considered to be lost (see 54).

Referring again to FIG. 3, when it has been determined that synchronization is lost (see also 54 in FIG. 5), this means that the synchronization management bit pair F0,F1 no longer occupies the last two bit positions before the trailing segment boundary, as that trailing segment boundary is currently being identified by the receiver. Due to the doubled-edge clocking employed in the example of FIG. 3, the synchronization bit pair can occupy only one of six possible positions within the segment. More specifically, the synchronization bit pair can occupy the R2,R3 position, the G0,G1 position, the G4,G5 position, the B2,B3 position, the VS,HS position or the F0,F1 position. Accordingly, in order to recover from a synchronization loss and re-establish synchronization, exemplary embodiments of the invention examine each of these possible bit pair positions from segment to segment in an attempt to identify the temporal position of the synchronization management bit pair F0,F1, which would permit synchronization recovery.

Accordingly, the exemplary operations of FIG. 4 can also be used in the process of recovering or re-establishing synchronization. More specifically, the operations of FIG. 4 can be applied in parallel to all of the aforementioned six bit pair positions on the MDI line. After performing the operations of FIG. 4 in parallel for all six bit pair positions, the synchronization recovery operations proceed to 61 in FIG. 6.

Figure 6:
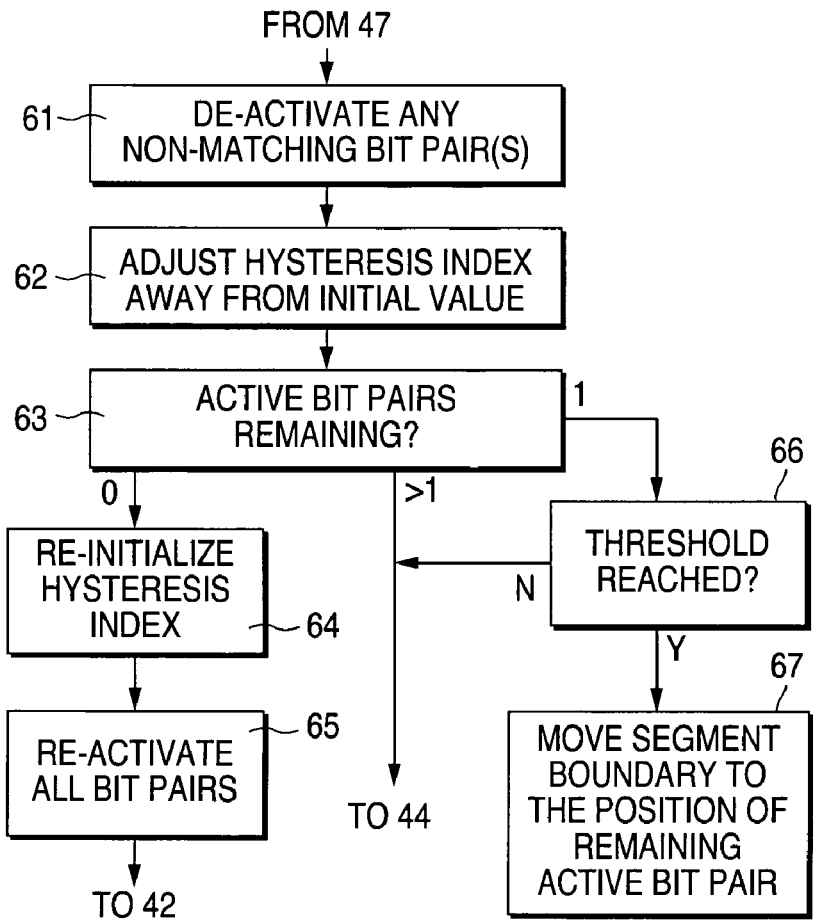
FIG. 6, taken together with FIG. 4, illustrates exemplary operations which can be performed to re-establish lost synchronization according to exemplary embodiments of the invention.

When operations reach 61 in FIG. 6, each of the six current bit pairs has already been compared to its corresponding predicted bit pair (at 47 in FIG. 4). At 61, any bit pair that does not match its predicted bit pair is de-activated from further consideration. Thereafter, at 62, the hysteresis index is adjusted away from its initial value. The number of active bit pairs remaining is then determined at 63. If more than one active bit pair remains, then operations return to 44 in FIG. 4 where, for each remaining active bit pair position, the next bit pair is predicted based on the previously predicted bit pair and the predetermined pattern. Subsequent operations in FIG. 4 then proceed in parallel for all remaining active bit pair positions. If no active bit pair remains at 63, then the hysteresis index is re-initialized at 64, and all six bit pairs are re-activated at 65. Thereafter, operations return to 42 in FIG. 4, where operations again proceed in parallel for all six bit pair positions.

If only one active bit pair remains at 63, then it is determined at 66 whether the hysteresis index has reached a threshold distance away from its initial value. If so, then the single remaining active bit pair is taken to be the synchronization management bit pair F0,F1. This means that synchronization can be re-established by simply adjusting the segment boundary at the receiver to properly re-position the synchronization management bit pair at the end of the segment. For example, and referring again to FIG. 3, if the last remaining active bit pair (the actual F0,F1 pair) is positioned at bit pair position G0,G1, then the receiver simply adjusts its identification of the segment boundary such that the G0,G1 bit pair appears at the end of the segment.

At 66, if the hysteresis index has not yet reached the threshold distance from its initial value, then operations return to 44 in FIG. 4 where, for the sole remaining active bit pair position, the next bit pair is predicted based on the previously predicted bit pair and the predetermined pattern. Subsequent operations in FIG. 4 then proceed for the sole remaining active bit pair position.

The hysteresis index is used in FIG. 6 to prevent the synchronization recovery process from deciding too quickly that synchronization has been re-established. Even if all but one of the bit pairs has been de-activated because they do not demonstrate the predetermined pattern from segment to segment, nevertheless that one bit pair remaining is not taken to be the synchronization management bit pair unless it has demonstrated the predetermined pattern over a predetermined number of consecutive segments defined by the hysteresis index.

The synchronization management described above with respect to FIGS. 4-6 permits the serial data streaming application to start from either an unknown, unsynchronized state or a known, synchronized state. This is possible because synchronization can be resolved from an unsynchronized state, albeit at the cost of some lost data segments that are consumed by the synchronization recovery procedure. In some embodiments that start operation from a known, synchronized state, the F1,F0 values in the first-transmitted segment are already known at the receiver, before the segment arrives, and can therefore be "predicted" before the segment arrives. This is indicated generally by broken line in FIG. 4.

Figure 7:
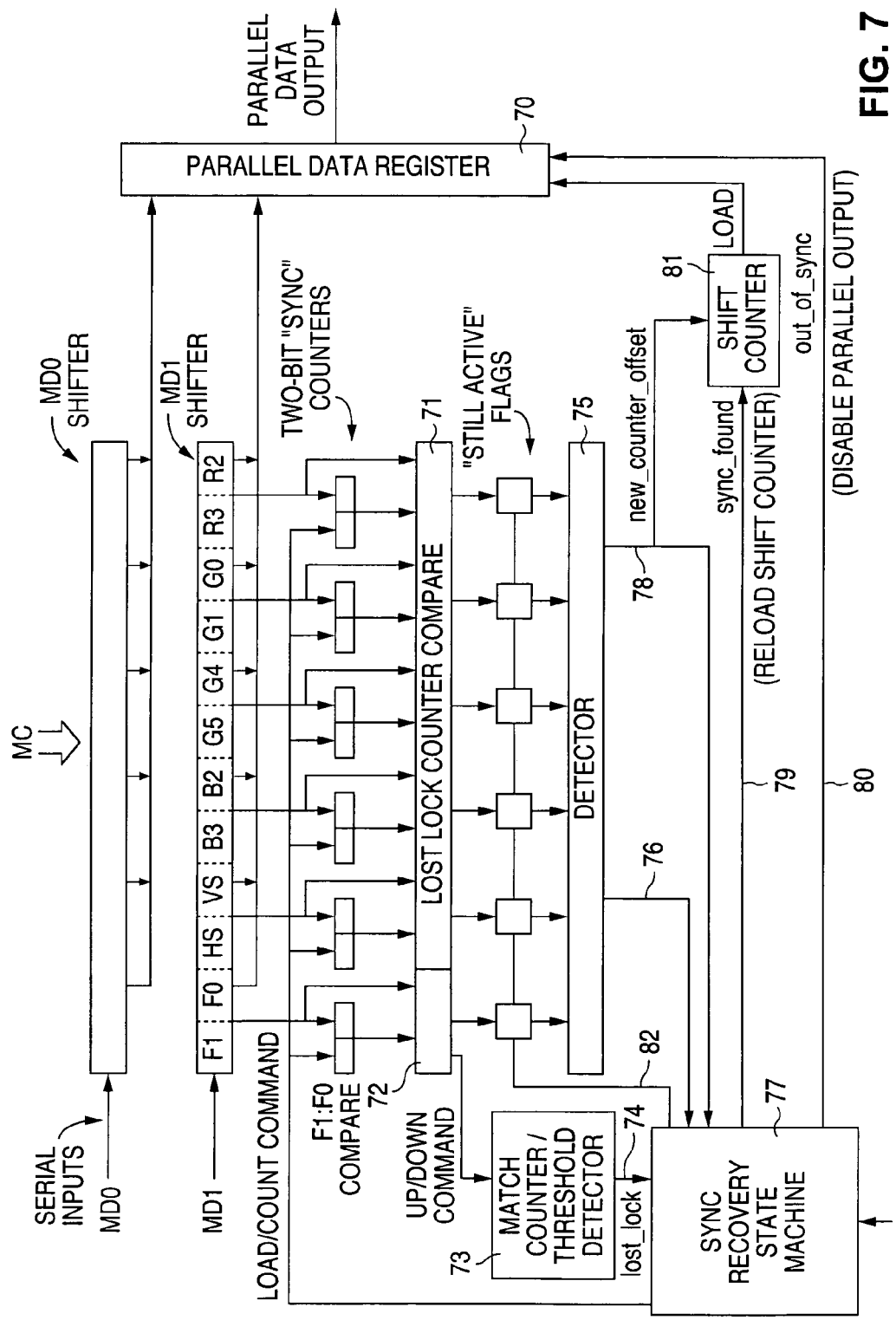
FIG. 7 diagrammatically illustrates a serial-to-parallel conversion apparatus with synchronization management capabilities according to exemplary embodiments of the invention.

FIG. 7 diagrammatically illustrates a serial-to-parallel conversion apparatus according to exemplary embodiments of the invention. The apparatus in the example of FIG. 7 receives the signals of FIG. 3 as its inputs, and outputs the data bits of the FIG. 3 segments in parallel format. The serial data clock MC provides the time base for the digital logic in FIG. 7. The apparatus includes serial inputs connected to the MD0 and MD1 lines, serial shifters that respectively receive the data from the MD0 and MD1 lines, and a parallel data register 70 that is connected to and cooperates with the serial shifters to perform the serial-to-parallel conversion. The remainder of the FIG. 7 apparatus constitutes logic for demarcating from one another the individual segments (see FIG. 3) in the received serial data stream MD1. By monitoring the continuance of correct segment demarcation, detecting the loss of correct segment demarcation, and re-establishing the correct segment demarcation, the demarcation logic of FIG. 7 manages the synchronization of the serial streaming data on both lines MD0 and MD1. The demarcation logic can perform various operations illustrated in FIGS. 4-7, as demonstrated below.

FIG. 7 illustrates that, under normal synchronization lock, the synchronization management bits F0 and F1 are the last two bits shifted into the MD1 shifter before completion of the current segment. When the synchronization is lost, the locations of specific data bits in the MD1 shifter (and the MD0 shifter) are unknown.

A synchronization recovery state machine 77 counts the edges of the serial data clock MC in order to keep track of the segment boundaries in the incoming serial data stream. Accordingly, the state machine 77 can perform the operations illustrated at 42 and 45 in FIG. 4. In FIG. 7, when the state machine 77 detects a segment boundary, it can output a load command to load the six bit pairs of the newly-received segment from the MD1 shifter into six two-bit "Sync" counters. This generally corresponds to 43 in FIG. 4. While the next segment is shifting in, the state machine 77 can output a count command to the six "Sync" counters, causing each counter to increment its bit pair and output the incremented value. With the counters having once been loaded from the MD1 shifter, the state machine 77 and the counters can thereafter effectuate the sequence of prediction operations described above relative to FIG. 4, for the aforementioned specific example of the bits F1 and F0 being programmed to implement a two-bit rollover counter function from segment to segment.

After the predicted bit pairs have been produced by incrementing the counters, the state machine 77 awaits the next segment boundary (see operation 45 in FIG. 4). When the next segment boundary occurs, a comparator 72 compares the current bit pair F1,F0, as currently in the MD1 shifter, to the predicted bit pair that is still at the output of the F1,F0 counter. If the comparator 72 finds that the current bit pair matches the predicted bit pair, then the comparator 72 outputs an up command to a hysteresis counter 73, thereby adjusting the hysteresis index toward (or keeping it at) its initial value (see also 55 in FIG. 5). If the comparator 72 finds no match, then the comparator 72 outputs a down command to the hysteresis counter 73 in order to adjust the hysteresis index away from its initial value. The hysteresis counter 73 includes a threshold detector which determines whether the hysteresis index has reached a predetermined distance from its initial value (see also 53 of FIG. 5). If so, the hysteresis counter 73 outputs a lost lock signal 74 to the synchronization recovery state machine 77, which in turn outputs an out-of-sync signal 80 to the parallel data register 70 in order to disable its parallel output.

During synchronization recovery operations, the above-described count (predict) operations are performed, and a "lost lock" comparator 71 is utilized in addition to the F1,F0 comparator 72 in order to determine which (if any) bit pairs currently in the MD1 shifter match their corresponding predicted value. A set of "still active" flags are utilized to represent the results of the compare operations performed at 71 and 72. All "still active" flags are initially set active. If a bit pair comparison does not result in a match, then the associated "still active" flag is set inactive (see also 61 in FIG. 6). A detector 75 detects the status of the "still active" flags and outputs a signal 76 to report this status to the state machine 77 (see also 63 in FIG. 6).

If the signal 76 indicates that more than one bit pair remains active, then the state machine causes the count (predict) and compare operations to be repeated (see 44-47 in FIG. 4). If the signal 76 indicates that only one bit pair remains active, then the state machine 77 examines a hysteresis index maintained therein (see 66 in FIG. 6). If the state machine determines that the hysteresis index has reached a threshold distance from its initial value, then the state machine activates a sync found signal 79 to re-load a shift counter 81. The shift counter 81 counts the edges of the serial data clock MC, and produces for the parallel register 70 a load signal that is active at every segment boundary. The detector 75 has determined the bit position of the sole remaining active bit pair, which is the actual bit position of the synchronization management bit pair F1,F0. The detector 75 provides a counter offset signal 78, which loads into the shift counter 81 a count value that will appropriately re-synchronize the load signal with the actual segment boundary (see also 67 in FIG. 6). The counter offset signal 78 is also provided to the state machine 77 so the state machine can also re-synchronize its timing to the actual segment boundary.

If the signal 76 from the detector 75 indicates that no active bit pairs remain, then the state machine 77 re-initializes its internally-maintained hysteresis index, and uses signal 82 to reactivate all of the "still active" flags (see 64 and 65 of FIG. 6).

Regarding the hysteresis counter 73 of FIG. 7, in some exemplary embodiments the initial hysteresis index (initial count value) is 4, and the threshold distance is 4, so the threshold detector activates the loss lock signal 74 whenever the count value reaches 0. When the hysteresis counter 73 receives an up-count command from the comparator 72, it counts upward only to the initialization value of 4, but does not count upward beyond the value of 4 and does not rollover from the value of 4. In some embodiments, the state machine 77 maintains the hysteresis index for synchronization recovery operations (see also 62 and 64 of FIG. 6) by simply initializing a count value, and decrementing the value at each segment boundary. Some embodiments set both the initial count value and the threshold to 4.

Some embodiments only load all six "Sync" counters of FIG. 7, and only operate comparator 71, detector 75 and the "still active" flags, in response to activation of the lost lock signal 74. As long as synchronization exists, only the F1,F0 bit pair and the comparator 72 are of interest.

Figure 8:
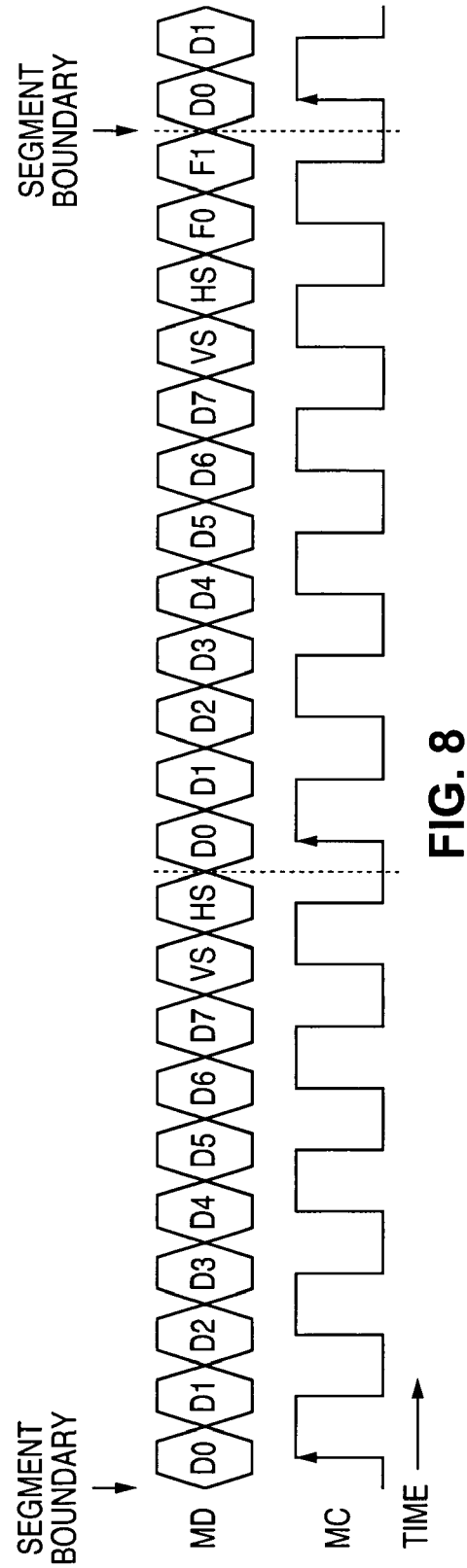
FIG. 8 illustrates how synchronization management signals can be incorporated into the serial data streaming application of FIG. 2 according to exemplary embodiments of the invention.

FIG. 8 illustrates how the segment structure of FIG. 2 can be modified to include synchronization management bits according to exemplary embodiments of the invention. As shown in FIG. 8, the data bits from two segments in FIG. 2 are combined together with the synchronization management bit pair F1,F0 to produce an extended segment for transmission. Although the synchronization management bit pair could of course be provided in each segment of FIG. 2, the creation of the extended segment illustrated in FIG. 8 reduces the overhead by 50% as compared to the situation where the bits F1,F0 are provided in each segment of FIG. 2. As will be apparent to workers in the art, the embodiments described above with respect to FIGS. 4-7 are readily applicable to the segment structure illustrated in FIG. 8.

Figure 9:
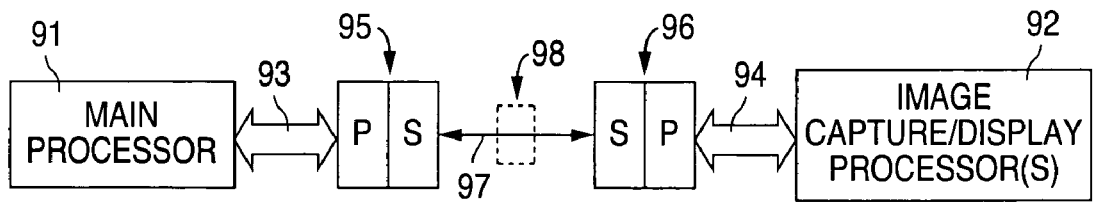
FIG. 9 diagrammatically illustrates exemplary embodiments of a data processing system according to the invention.

FIG. 9 diagrammatically illustrates a data processing system according to exemplary embodiments of the invention. In the example of FIG. 9, a main processor 91 communicates with an image capture processor and/or an image display processor (shown generally at 92) via a parallel data bus 93, an interface 95, a serial data connection 97 (e.g. serial transmission cabling), an interface 96, and a parallel data bus 94. The interfaces 95 and 96 convert between serial and parallel data formats. In FIG. 9, broken line 98 shows where the hinge structure would be located in flip-type mobile telephone embodiments. As shown, the serial link 97 would traverse the hinge structure 98. In the system of FIG. 9, the serial-to-parallel conversion performed by the interfaces 95 and 96 can utilize techniques such as those described above with respect to FIGS. 3-8.

Although the present invention has been described with an exemplary embodiment, various changes and modifications may be suggested to one skilled in the art. It is intended that the present invention encompass such changes and modifications as fall within the scope of the appended claims.

What is claimed is:

1. A serial-to-parallel conversion apparatus, comprising:
an input configured to receive first and second segments of bits in a continuous stream of serial data bits, the continuous stream divided into consecutive segments, each segment divided into groups of bits, each group of bits having an equal number of bits;
a plurality of sync counters, each sync counter configured to store one bit group in the first segment of bits;
a state machine configured to cause each sync counter to increment the bit group stored in that sync counter;
a comparator configured to compare each incremented bit group of the first segment stored in the sync counters with a corresponding bit group in the second segment;
a plurality of status flags, each status flag corresponding to one of the sync counters and configured to indicate whether a bit group in the corresponding sync counter is active; and
a detector configured to detect a status of each of the status flags;
wherein the detector is configured to send a counter offset signal to the state machine and the state machine is configured to move a boundary between segments when the detector detects that only one of the status flags is set to "active".

2. The apparatus of claim 1, wherein each status flag is set to "inactive" when the incremented bit group of the first segment stored in the corresponding sync counter does not match the corresponding bit group in the second segment.

3. The apparatus of claim 2, wherein the state machine is configured to reset each status flag to "active" when all status flags are set to "inactive".

4. The apparatus of claim 1, wherein the first and second segments of data bits are consecutive segments.

5. The apparatus of claim 4, wherein both said first and second segments of data bits consist of a common number of consecutive data bits.

6. The apparatus of claim 1, wherein both said first and second segments of data bits consist of a common number of data bits.

7. The apparatus of claim 6, wherein said number of data bits in each group is two data bits.

8. The apparatus of claim 1, wherein the state machine is configured to track segment boundaries in the continuous stream by counting edges of a serial data clock.

9. The apparatus of claim 3, further comprising a parallel data register coupled to said input.

10. The apparatus of claim 8, wherein upon detection of a segment boundary, the state machine is further configured to output a load command to the plurality of sync counters.

11. The apparatus of claim 1, wherein the detector is configured to send the counter offset signal only when a hysteresis index reaches a threshold value.

12. The apparatus of claim 2, further comprising a hysteresis index, the state machine configured to increase said hysteresis index when the incremented bit group of the first segment stored in the corresponding sync counter matches the corresponding bit group in the second segment.

13. The apparatus of claim 12, wherein the state machine is configured to decrease the hysteresis index when the incremented bit group of the first segment stored in the corresponding sync counter does not match the corresponding bit group in the second segment.

14. A method for supporting serial-to-parallel conversion, comprising:
receiving first and second segments of bits in a continuous stream of serial data bits, the continuous stream divided into consecutive segments, each segment divided into groups of bits, each group of bits having an equal number of bits;
storing, in each of a plurality of sync counters, one bit group in the first segment of bits;
causing, at a state machine, each sync counter to increment the bit group stored in that sync counter;
comparing each incremented bit group of the first segment stored in the sync counters to a corresponding bit group in the second segment;
in each of a plurality of status flags, each status flag corresponding to one of the sync counters, storing an indication of whether a bit group in the corresponding sync counter is active;
detecting a status of each of the status flags; and
upon detecting that only one status flag is set to "active", moving a boundary between received segments of bits to a position of the bit group corresponding to the one status flag set to "active."

15. The method of claim 14, further comprising setting each status flag to "inactive" when the incremented bit group of the first segment stored in the corresponding sync counter does not match the corresponding bit group in the second segment.

16. The method of claim 15, further comprising setting each status flag to "active" when all status flags are set to "inactive".

17. The method of claim 14, further comprising the steps of:
counting edges of a serial data clock to detect segment boundaries in the continuous stream; and
upon detection of a segment boundary, providing a load command to the plurality of sync counters.

18. The method of claim 14, wherein the first and second segments of data bits consist of a common number of consecutive data bits.

19. The method of claim 18, wherein the number of data bits in each group is two data bits.

20. A data processing system, comprising:
first and second data processors, said first and second data processors respectively including first and second parallel data buses;
a serial data transmission path;
first and second interfaces configured to couple said serial data transmission path to said first and second parallel data buses, respectively; and
one of said first and second interfaces including a serial-to-parallel conversion apparatus, said serial-to-parallel conversion apparatus including:
an input configured to receive first and second segments of bits in a continuous stream of serial data bits, the continuous stream divided into consecutive segments, each segment divided into groups of bits, each group of bits having an equal number of bits;
a plurality of sync counters, each sync counter configured to store one bit group in the first segment of bits;
a state machine configured to cause each sync counter to increment the bit group stored in that sync counter;
a comparator configured to compare each incremented bit group of the first segment stored in the sync counters with a corresponding bit group in the second segment;

a plurality of status flags, each status flag corresponding to one of the sync counters and configured to indicate whether a bit group in the corresponding sync counter is active; and a detector configured to detect a status of each of the status flags;

wherein the detector is configured to send a counter offset signal to the state machine and the state machine is configured to move a boundary between segments when the detector detects that only one of the status flags is set to "active".

* * * * *